United States Patent
Rosenfeld et al.

(10) Patent No.: US 10,981,428 B2
(45) Date of Patent: Apr. 20, 2021

(54) SLEEVE-TYPE FREEWHEEL WITH TORQUE LIMITATION FOR TWO-WHEELED VEHICLE STARTER APPLICATIONS

(71) Applicant: SCHAEFFLER TECHNOLOGIES AG & CO. KG, Herzogenaurach (DE)

(72) Inventors: Jochen Rosenfeld, Erlangen (DE); Kilian Marsing, Hetzles (DE); Klaus-Peter Koeneke, Oberreichenbach (DE); Hartmut Krehmer, Erlangen (DE); Harald Hochmuth, Hagenbuechach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 95 days.

(21) Appl. No.: 16/318,433

(22) PCT Filed: Jun. 20, 2017

(86) PCT No.: PCT/DE2017/100516
§ 371 (c)(1),
(2) Date: Jan. 17, 2019

(87) PCT Pub. No.: WO2018/014901
PCT Pub. Date: Jan. 25, 2018

(65) Prior Publication Data
US 2019/0263211 A1  Aug. 29, 2019

(30) Foreign Application Priority Data

Jul. 22, 2016 (DE) .................. 102016213424.8

(51) Int. Cl.
*B60G 17/02* (2006.01)
*B60G 17/015* (2006.01)
(Continued)

(52) U.S. Cl.
CPC ......... *B60G 17/021* (2013.01); *B60G 17/015* (2013.01); *F16C 19/10* (2013.01);
(Continued)

(58) Field of Classification Search
CPC ...... B60G 17/00; B60G 17/015; B60G 17/02; B60G 17/021; F16C 19/10; F16C 19/305; F16C 25/083; F16H 25/2204
See application file for complete search history.

(56) References Cited

U.S. PATENT DOCUMENTS

| | | | |
|---|---|---|---|
| 5,553,836 A | * | 9/1996 | Ericson .................. B60G 11/16 267/177 |
| 5,956,997 A | | 9/1999 | Oetjen et al. |

(Continued)

FOREIGN PATENT DOCUMENTS

| | | |
|---|---|---|
| DE | 102007025468 A1 | 12/2008 |
| DE | 102007026606 A1 | 12/2008 |

(Continued)

OTHER PUBLICATIONS

International Search Report for International Application No. PCT/DE2017/100516 dated Sep. 8, 2017.

*Primary Examiner* — Barry Gooden, Jr.
(74) *Attorney, Agent, or Firm* — Brooks Kushman P.C.

(57) ABSTRACT

An active wheel suspension element has a ball screw drive having a screw drive with a threaded spindle and a spindle nut which is mounted in a housing via an axial bearing. The axial bearing is formed as a rolling bearing, whose rolling element rolls directly on the spindle nut.

12 Claims, 3 Drawing Sheets

(51) Int. Cl.
*F16C 19/10* (2006.01)
*F16C 19/30* (2006.01)
*F16C 25/08* (2006.01)
*F16H 25/22* (2006.01)

(52) U.S. Cl.
CPC .......... *F16C 19/305* (2013.01); *F16C 25/083* (2013.01); *F16H 25/2204* (2013.01); *B60G 2202/32* (2013.01); *B60G 2202/42* (2013.01); *B60G 2204/418* (2013.01); *B60G 2204/419* (2013.01); *B60G 2500/30* (2013.01); *F16C 2326/05* (2013.01)

(56) References Cited

U.S. PATENT DOCUMENTS

| | | | | |
|---|---|---|---|---|
| 8,671,789 | B2 * | 3/2014 | Osterlaenger | F16H 25/2233 188/72.8 |
| 9,694,643 | B2 * | 7/2017 | Mersmann | B60G 17/021 |
| 2002/0089107 | A1 * | 7/2002 | Koh | B60G 17/021 267/218 |
| 2004/0036206 | A1 * | 2/2004 | Loser | B60G 17/021 267/218 |
| 2006/0175787 | A1 * | 8/2006 | Munster | F16F 15/02 280/124.145 |
| 2007/0210539 | A1 * | 9/2007 | Hakui | B60G 17/021 280/5.514 |
| 2009/0045595 | A1 * | 2/2009 | Michel | B60G 17/021 280/6.157 |
| 2009/0057969 | A1 * | 3/2009 | Michel | B60G 17/021 267/218 |
| 2009/0108546 | A1 * | 4/2009 | Ohletz | B60G 15/063 280/6.16 |
| 2009/0283977 | A1 * | 11/2009 | Michel | B60G 7/04 280/6.157 |
| 2011/0210525 | A1 * | 9/2011 | Michel | B60G 17/021 280/5.5 |
| 2011/0221109 | A1 * | 9/2011 | Hinouchi | F16H 25/20 267/221 |
| 2014/0131961 | A1 * | 5/2014 | Moore | F16F 1/121 280/6.157 |
| 2016/0221410 | A1 * | 8/2016 | Mersmann | B60G 17/021 |
| 2019/0226562 | A1 * | 7/2019 | Hochmuth | F16C 19/30 |
| 2019/0248203 | A1 * | 8/2019 | Krehmer | B60G 17/0157 |
| 2020/0049242 | A1 * | 2/2020 | Breton | F16H 25/2204 |

FOREIGN PATENT DOCUMENTS

| | | |
|---|---|---|
| DE | 102013222648 A1 | 5/2015 |
| DE | 102014203861 A1 | 9/2015 |
| EP | 1479542 A2 | 11/2004 |
| WO | 2004034550 A1 | 4/2004 |

* cited by examiner

SLEEVE-TYPE FREEWHEEL WITH TORQUE LIMITATION FOR TWO-WHEELED VEHICLE STARTER APPLICATIONS

CROSS-REFERENCE TO RELATED APPLICATIONS

This application is the U.S. National Phase of PCT/DE2017/100516 filed Jun. 20, 2017, which claims priority to DE 102016213424.8 filed Jul. 22, 2016, the entire disclosures of which are incorporated by reference herein.

TECHNICAL FIELD

The disclosure relates to a suitable active wheel suspension element for a chassis of a motor vehicle.

BACKGROUND

An active wheel suspension element for the adjustable spring suspension of a wheel of a motor vehicle is known from the DE 10 2013 222 648 A1. Two mounting elements of the known wheel suspension element are provided for its mounting to an element that is supporting the structure of the vehicle on the one hand and to an element that is supporting the wheel on the other hand. A suspension spring is braced between one of these mounting elements and an adjustable spring seat. The adjusting of the spring seat is possible via a linear actuator, which includes a rotation motor and a transmission. The transmission of the known wheel suspension element may refer to a ball screw drive or to a planetary roller screw drive.

Further examples of adjustable suspension elements are disclosed in the documents DE 10 2007 026 606 A1, DE 10 2007 025 468 A1 and EP 1 479 542 A2.

SUMMARY

This disclosure is based on an objective to develop an active wheel suspension element in comparison to the mentioned prior art with respect to a particularly compact and at the same time sturdy design.

This objective is achieved via a wheel suspension element featuring the characteristics disclosed below.

The wheel suspension element is designed as an active wheel suspension element, which works in association with a screw drive that comprises a threaded spindle and a spindle nut. The spindle nut is hereby mounted in such a way within a housing of the wheel suspension element via an axial bearing that it can be rotated, but not shifted. The axial bearing of the spindle nut is designed as a rolling bearing, wherein the rolling elements, e.g. the balls, rolls or needles roll directly on the spindle nut. The spindle nut itself thus provides at least one rolling track for the rolling elements of the axial bearing. A rolling track for the respective rolling elements of the axial bearing i can be formed at each end face of the spindle nut.

In the case that the screw drive is designed as a ball screw drive or the like that is functioning with rolling elements, such as rollers, various types of tracks for the rolling element, in particular tracks of the axial bearing on the one hand and on the other hand tracks of the spindle drive, are formed via the spindle nut. By well-known heat treatment methods it is possible to achieve suitable characteristics of the spindle nut for the rolling bearings. The formation of the tracks of the axial rolling bearings directly via the spindle nut favors the compact structure of the wheel suspension element both in radial as well as in axial direction.

According to one possible embodiment, the axial bearing of the wheel suspension element includes an axial ring that can be variably positioned in relation to the housing. The variable positioning can be provided e.g. via an adjustability of the axial ring via a thread or via intermediate plates of varying thickness, e.g. shims, that can be inserted selectively. In any case, the axial ring represents a bearing ring of one of the two axial rolling bearings, which together form the axial bearing of the wheel suspension element.

In a particularly embodiment, the axial ring is spring-loaded in relation to the housing, wherein the spring-loading extends in axial direction. For the spring-loaded support of the axial ring at the housing, e.g. a plate spring or an arrangement of several plate springs is suitable. The rolling elements, in particular the rolls or needles, of the axial rolling bearing can either roll directly on the axial ring that is mounted in a spring-loaded manner in the housing, or it can roll via an insertion of an axial bearing disk. In both cases, the axial ring can be designed as an L-section ring, which can be supported towards the radial outside by forming a plain bearing at the housing. Due to the angled cross-section of the axial ring, e.g. L-section ring, a support of the spring arrangement, in particular of the plate spring arrangement, is provided in an embodiment, which exerts a force in axial direction onto the L-section ring, in radial direction towards the outside. A cylindrical section, e.g. a sleeve section of the L-section ring is hereby placed around the spring arrangement in a ring-shaped manner. On the other hand, axial forces are transferred between the spring arrangement and a disc section of the L-section ring which is adjacent to the sleeve section. When the spring arrangement is compressed to its maximum, the L-section ring can function as a blocking protection, so that a remaining spring path of the spring arrangement will be retained, e.g. that it does hit on the block.

The force transmission between the spring arrangement and the disk section of the L-section ring can be carried out in a ring-shaped area according to this embodiment, whose diameter deviates from the partial circle of the axial rolling bearing by less than half of the width of the rolling elements of this axial bearing when measured in radial direction of the screw drive. This means that an imagined cylinder that runs concentrically towards the center axis of the screw drive, which is places in the center through this ring-shaped area, in which the spring arrangement exerts an axial force onto the L-section ring, intersects the rolling elements of the axial bearing, which comprises the L-section ring on the one hand and the spindle nut as bearing ring on the other side.

The spindle nut can be basically driven via an electrical direct drive or via a transmission, e.g. a gear transmission or a continuously variable transmission. The driving of the spindle nut can e.g. be carried out via a belt drive that is designed as a reduction gear unit. To accomplish this, a belt pulley, which is located around the spindle nut or which is directly formed by the spindle nut that is positioned within the housing of the wheel suspension element, protrudes in one embodiment both the spring-loaded axial ring as well as the spring arrangement that is provided for its spring-loading in radial direction, with reference to the longitudinal axis of the screw drive.

The housing or a part that is solidly connected to the housing of the wheel suspension element also forms in one embodiment a seat for a helical spring, which functions as a suspension spring. The active wheel suspension element is suitable for passenger vehicles as well as for trucks and other vehicles, e.g. for construction machines. Suspensions of different vehicles can comprise a varying number of active wheel suspension elements. It is for example possible that two active wheel suspension elements are provided at one single axis of the vehicle. In like manner it is possible that each vehicle axis is equipped with active wheel suspension elements.

BRIEF DESCRIPTION OF THE DRAWINGS

In the following, several design embodiments are explained in more detail via a drawing. It is shown.

DETAILED DESCRIPTION OF THE DRAWINGS

The following explanations refer to both design examples, if not stated otherwise. Corresponding parts or those which are principally functioning in the same way in all figures are identified with the same reference signs.

The wheel suspension element that is in general identified with the reference sign 1 refers to an active element of a vehicle suspension, in particular that of a passenger vehicle.

Figure 2:
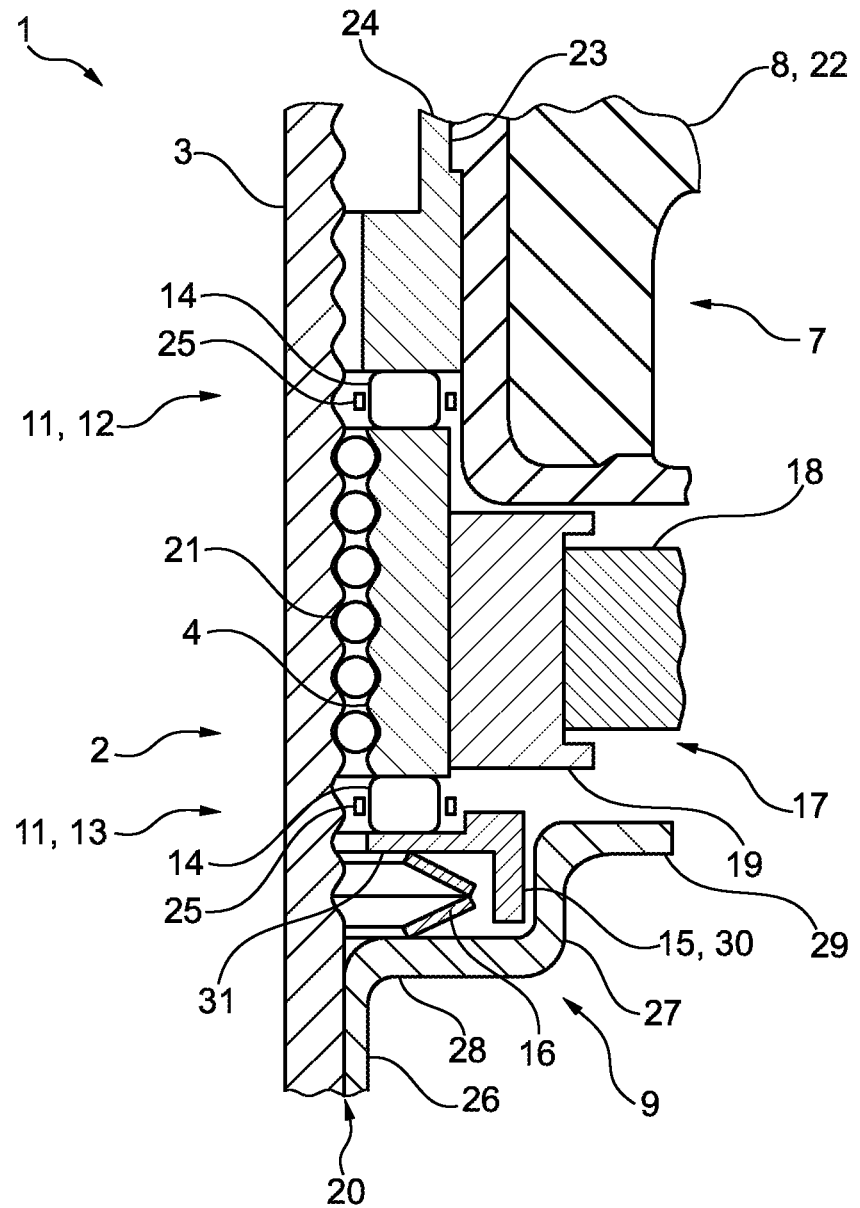
FIG. 2 details of the wheel suspension element according to FIG. 1.
Figure 3:
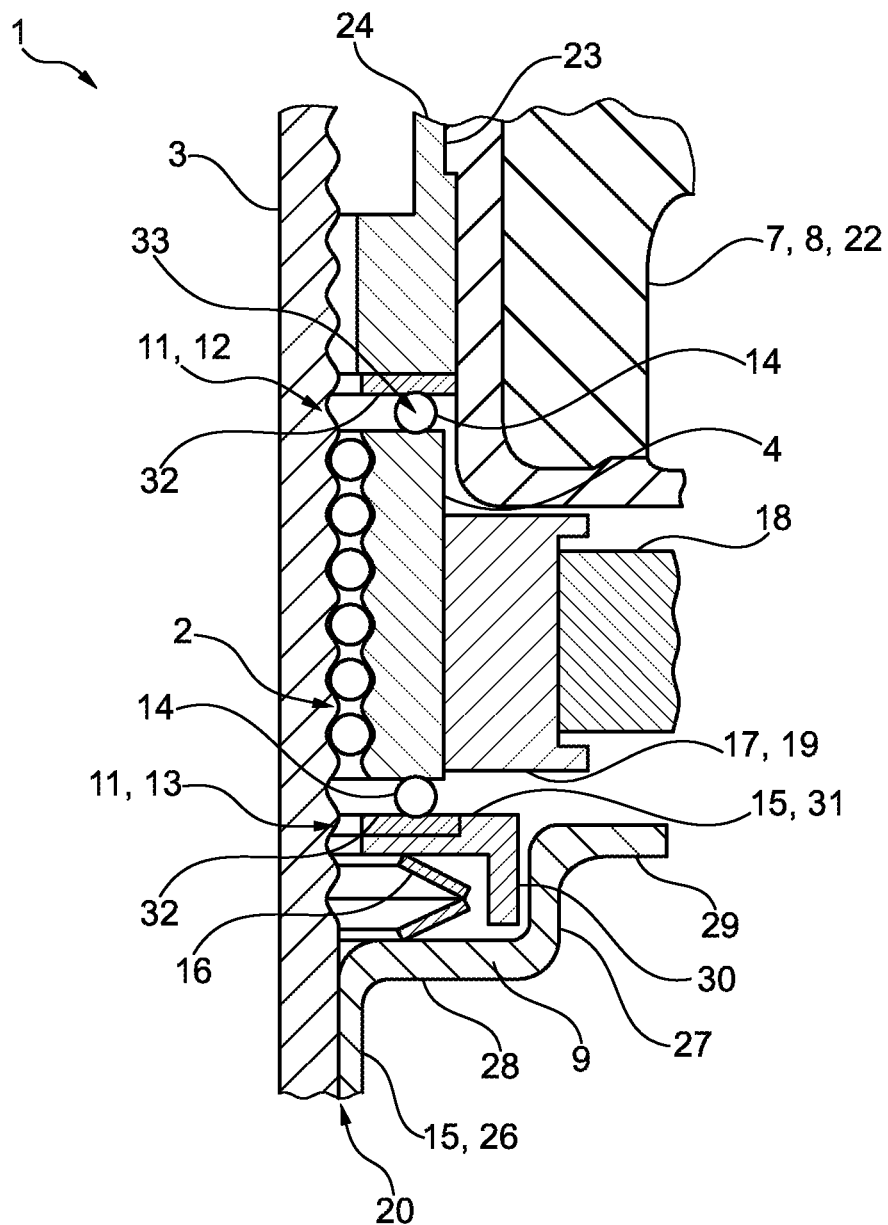
FIG. 3 details of an alternative wheel suspension element in a depiction that is analog to FIG. 2.

The wheel suspension element 1 comprises a screw drive 2, e.g. a ball screw drive, with a threaded spindle 3 and a spindle nut 4. An adapter element 5 is solidly connected to the threaded spindle 3. The longitudinal axis of the screw drive 2 and thus of the entire wheel suspension element 1 is identified with L. The details of the wheel suspension elements 1 that are outlined in FIGS. 2 and 3 are respectively located on the right side of the longitudinal axis L that is not shown in these depictions.

Figure 1:
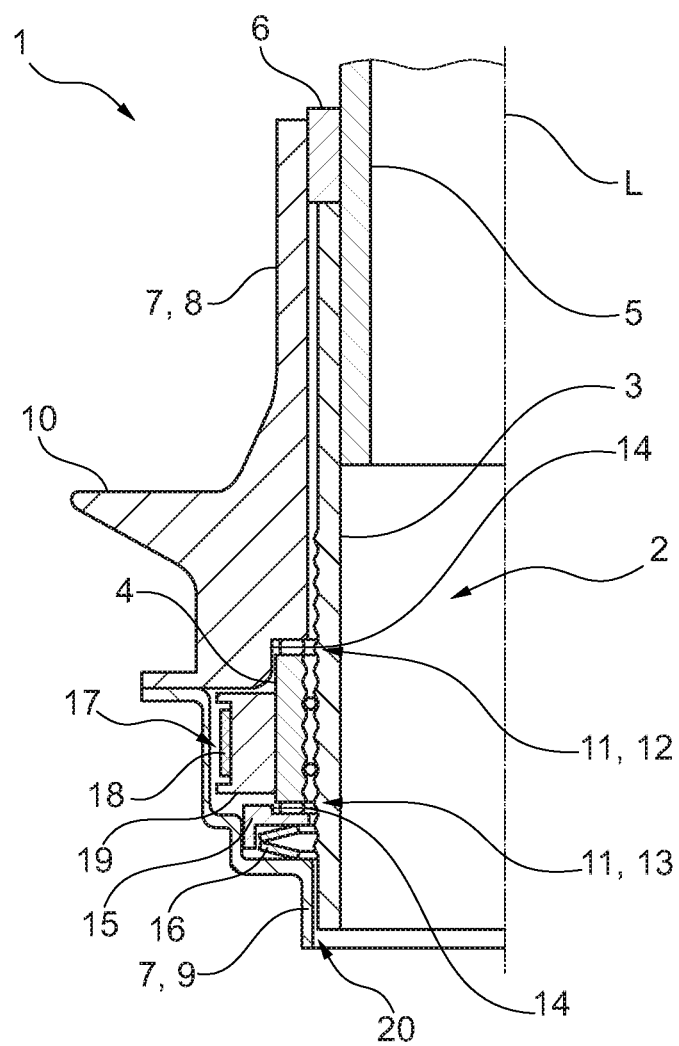
FIG. 1 partially a first design example of an active wheel suspension element.

By the plain bearing element 6, which can be seen in FIG. 1, the arrangement of spindle nut 4 and adapter element 5 can be shifted in relation to a housing 7 of the wheel suspension element 1. A locking device, which prevents the twisting of spindle nut 4 in relation to housing 7, is not depicted in the figures.

Housing 7 is composed of an upper housing portion 8 and a lower housing portion 9. The upper housing portion 8 provides a seat area 10 for a not depicted helical spring. In comparison to the upper housing portion 8, the lower housing portion 9 is designed with essentially thinner walls. The reference "upper" and "lower" housing portion 8, 9 are chosen for describing a distinguishing between the housing portions 8, 9 and do not imply any statement regarding their installation position within the motor vehicle.

An axial bearing 11 is located within housing 7 mainly in the area of the lower housing portion 9, which is made as a metal sheet element, and it serves as the bearing for the spindle nut 4 within housing 7. The axial bearing 11 is composed by an upper axial bearing 12 and a lower axial bearing 13, wherein also in this case the reference "upper" and "lower" is merely referring to the arrangement in the figures, which does not mandatorily correspond to the arrangement within the motor vehicle.

As rolling elements 14 of the axial bearings 12, 13, rolls are provided in the design example according to FIGS. 1 and 2, and balls for the design example according to FIG. 3. In like manner, it is possible to combine different bearing construction types, in particular ball bearings, rolling bearings and needle bearings for the bearing of spindle nut 4 within one individual wheel suspension element 1.

In all cases, the rolling elements 14 of the axial bearing 11 roll directly on the surface of spindle nut 4. In the design example according to FIGS. 1 and 2, the axial bearing 11 does not feature any guiding function in radial direction, whereas the axial bearing 11 according to FIG. 3 assumes in addition to its main function, e.g. the axial bearing function, also a bearing function in radial direction.

In each one of the design examples outlined in FIGS. 1 to 3, the lower axial ring 13 includes an axial ring 15, which is designed as an L-section ring. Axial ring 15 is spring-loaded via two plate springs 16 that are set one behind the other. The plate springs 16 are located in a ring-shaped space featuring an almost rectangular cross-section, which is limited on two sides via the axial ring 15 and on the other two sides via the lower housing portion 9 as well as via the threaded spindle 3. The spring deflection of the plate springs 16 is dimensioned in such a way, that the two axial bearings 12, 13 are operating under tension in each operating mode of the wheel suspension element 1.

Spindle nut 4, which is located in axial direction, e.g. in longitudinal direction of the longitudinal axis L, between the spring-loaded axial ring 15 and the upper housing portion 8, is driven via a belt drive 17. A belt is hereby marked with 18, and a belt pulley, which is rotationally connected to as well as enclosing spindle nut 4, is marked with 19. Along with spindle nut 4, belt drive 17 is located axially between the plain bearing 6, which is arranged in the upper portion in the arrangement according to FIG. 1, and an optional plain bearing 20, which is arranged in the lower portion in the arrangement according to FIG. 1 as well as in the arrangement according to FIG. 3, which can—in deviation to the simplified depiction—also reach around a separate, ring-shaped plain bearing element. In the embodiment according to the FIGS. 1 and 2, the axial bearing 11, via which spindle nut 4 is mounted between the two housing portions 8, 9, is carrying out a pure axial bearing function, while the radial bearing is being carried out via plain bearing 6 as well as by plain bearing 20. In this case, a radial bearing of spindle nut 4 is provided exclusively via the bearing elements 21, in particular balls, of screw drive 2. A ball return system within screw drive 2 is not depicted.

The upper housing portion 8 is designed with multiple parts both in the design example according to the FIGS. 1 and 2 as well as in the design example according to FIG. 3. In detail, an outer housing portion 22, an intermediate housing portion 23, as well as an inner housing portion 24 can be seen, wherein the rolling elements 14, e.g. the rollers, roll directly on the inner housing portion 24 in the case of FIG. 2. Cages 25 are furthermore indicated in FIG. 2, which guide the rolling elements 14 within the axial bearings 12, 13.

In the design example according to the FIGS. 1 and 2, the design of the lower housing portion 9 corresponds to the design according to FIG. 3. The lower housing portion 9 is designed in a stepped manner, wherein an inner cylindrical section 26, which is located on the side of the plate springs 16 that is facing away from the axial bearing 11, provides a bearing component of the plain bearing 20. A middle cylindrical section 27, which is also an integral component of the lower housing portion 9, is connected to the inner cylindrical section 26 via an inner disc section 28. The inner disc section 28 is located within a normal plane with reference to the longitudinal axis L and is arranged parallel to the axial ring 15, wherein one of the disc springs 16 contacts the inner disc section 28 and the other disc spring 16 contacts the axial ring 15 within a respectively ring-shaped area. The two ring-shaped areas are located within an imagined cylinder that is aligned concentrically with regards to the longitudinal axis L, which intersects the rolling elements 14 of both axial bearings 12, 13.

The cylindrical inner surface of the central cylindrical section 27 provides a limit stop for the axial ring 15 in radial direction. A cylindrical sleeve section of the axial ring 15, which is marked with 30, can be slightly shifted in relation to the central cylindrical section 27 of the lower housing portion 9. The sleeve section 30 represents one of the side surfaces of the substantially rectangular cross-section of the ring-shaped space in which the arrangement of the disc springs 16 is located. A disc section of the axial ring 15, which is marked with 31, adjoins the sleeve section 30 in radial direction towards the inside, which forms a further side surface of the before-mentioned ring-shaped space, which is rectangular in cross-section. A plane that is running through the disc section 31 intersects an outer disc section, that is marked with 29, in the arrangements according to FIGS. 1 to 3, which is a component of the lower housing portion 9.

In contrast to the design example according to the FIGS. 1 and 2, the axial bearings 12, 13 of the wheel suspension element 1 according to FIG. 3 is not designed as a rolling bearing, but as an axial ball bearing. Just like the rolling elements 14, which are designed as rollers in the case of the FIGS. 1 and 2, the ball-shaped rolling elements 14 of the axial bearing 11 according to FIG. 3 roll directly on the end faces of spindle nut 4. For this purpose, ball tracks 33 are located within both end faces of spindle nut 4. On the opposite sides of the axial bearing 12, 13, that is on the side of the inner housing portion 24 or on the side of the axial ring 15, the rolling elements 14, in particular the balls, of the wheel suspension element 1 according to FIG. 3 roll on a respectively separate axial bearing disc 32. In contrast to the configuration according to FIG. 4, it is also possible to implement construction types, in which a separate axial bearing disc 32 is only provided on one of the end faces of axial bearing 11. In like manner, it is possible to implement modifications of the design example according to FIGS. 1 and 2, in which the rolling elements 14, in particular the rollers, do not roll directly on the inner housing portion 24 as well as on the disc section 31 of axial ring 15, but at least in one case on a separate bearing disc.

LIST OF REFERENCE SIGNS

1 Wheel suspension element
2 Screw drive
3 Threaded spindle
4 Spindle nut
5 Adapter element
6 Plain bearing element
7 Housing
8 Upper housing portion
9 Lower housing portion
10 Seat area
11 Axial bearing
12 Upper axial bearing
13 Lower axial bearing
14 Rolling bearing
15 Axial ring
16 Plate spring
17 Transmission, belt drive
18 Belt
19 Belt pulley
20 Plain bearing
21 Rolling element of the screw drive
22 Outer housing portion
23 Intermediate housing portion
24 Inner housing portion
25 Cage
26 Inner cylindrical section
27 Middle cylindrical section
28 Inner disc section
29 Outer disc section
30 Sleeve section
31 Disc section
32 Axial bearing disc
33 Ball track
L Longitudinal axis

The invention claimed is:
1. An active wheel suspension element comprising:
a screw drive which includes a threaded spindle and a spindle nut which is mounted in a housing via an axial bearing, wherein the axial bearing is a rolling bearing with rolling elements that roll directly on the spindle nut;
wherein the axial bearing has an axial ring positioned in a variable way within the housing, wherein the axial ring is spring-loaded in relation to the housing, and wherein the axial ring is mounted in a spring-loaded manner in the housing at least via a plate spring.
2. The active wheel suspension element according to claim 1, wherein the rolling elements roll directly on the axial ring.
3. The active wheel suspension element according to claim 1, wherein the axial ring is designed as an L-section ring, which is supported in a radial direction by forming a plain bearing at the housing.
4. The active wheel suspension element according to claim 1, wherein a belt-drive transmission is provided to drive the spindle nut.
5. The active wheel suspension element according to claim 1, wherein rollers or needles are provided as the rolling elements of the axial bearing.
6. The active wheel suspension element according to claim 1, wherein balls are provided as the rolling elements of the axial bearing.
7. The active wheel suspension element according to claim 1, wherein the screw drive is designed as a ball screw drive.
8. An active wheel suspension element comprising:
a housing;
a screw drive extending along a longitudinal axis and configured to rotate relative to the housing, the screw drive including:
a threaded spindle having threads extending along the longitudinal axis, and
a spindle nut radially spaced from the threaded spindle and having a pair of radially-extending surfaces, the spindle nut rotatably coupled to the housing via a rolling bearing having rolling elements that directly contact and roll directly on the spindle nut.
9. The active wheel suspension element of claim 8, wherein at least one of the rolling elements directly contacts and rolls directly on a radially-extending surface of the housing.
10. The active wheel suspension element of claim 8, wherein the axial bearing has an axial ring extending about the longitudinal axis and variably positioned within the housing.

11. The active wheel suspension element of claim 10, wherein the axial ring is spring-loaded against the housing.

12. The active wheel suspension element of claim 11, wherein at least one of the rolling elements directly contacts and rotates on a radially-extending surface of the axial ring.

* * * * *